US009503866B2

(12) United States Patent
Corson et al.

(10) Patent No.: US 9,503,866 B2
(45) Date of Patent: *Nov. 22, 2016

(54) METHODS AND APPARATUS FOR MANAGING GROUP MEMBERSHIP FOR GROUP COMMUNICATIONS

(71) Applicant: QUALCOMM Incorporated, San Diego, CA (US)

(72) Inventors: Mathew Scott Corson, Gillette, NJ (US); Alan O'Neill, Henley Beach (AU); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 13/937,727

(22) Filed: Jul. 9, 2013

(65) Prior Publication Data

US 2013/0294324 A1 Nov. 7, 2013

Related U.S. Application Data

(63) Continuation of application No. 11/204,769, filed on Aug. 16, 2005, now Pat. No. 8,565,801.

(60) Provisional application No. 60/602,021, filed on Aug. 16, 2004.

(51) Int. Cl.
*H04L 1/00* (2006.01)
*H04W 4/08* (2009.01)
(Continued)

(52) U.S. Cl.
CPC ............... *H04W 4/08* (2013.01); *H04W 8/186* (2013.01); *H04W 4/06* (2013.01); *H04W 88/08* (2013.01)

(58) Field of Classification Search
CPC ..... H04W 4/06; H04M 3/561; H04M 3/562; H04M 3/563; H04M 3/564
USPC ................................ 370/310, 312, 259, 260
See application file for complete search history.

(56) References Cited

U.S. PATENT DOCUMENTS 5,564,071 A 10/1996 Liou et al.
6,006,253 A 12/1999 Kumar et al.
(Continued)

FOREIGN PATENT DOCUMENTS

CN 1437818 A 8/2003
EP 1274270 1/2003
(Continued)

OTHER PUBLICATIONS

International Preliminary Report on Patentability Including the Written Opinion of the International Searching Authority From International Application No. PCT/US2005/029086, pp. 1-5, Feb. 20, 2007.
(Continued)

*Primary Examiner* — Dady Chery
(74) *Attorney, Agent, or Firm* — Raphael Freiwirth; Michael F. Taveira

(57) ABSTRACT

Improved group communications methods which are well suited for a wireless environment are described. End nodes request that access nodes make changes in group membership information maintained at the access node. The access node responds to the requests by a response signal indicating a grant or denial of the request. Requests may be to add or remove the end node, e.g., a mobile wireless terminal, from a particular group membership list identified in the request signal. The access node maintains a detailed list of group members and uses the information to control how signals, e.g., packets, are transmitted to the group members. Group membership information may be updated at the access node at the time of handoff and/or an end node enters the cell or otherwise changes its point of network attachment.

33 Claims, 7 Drawing Sheets

(51) Int. Cl.
*H04W 8/18* (2009.01)
*H04W 4/06* (2009.01)
*H04W 88/08* (2009.01)

(56) References Cited

U.S. PATENT DOCUMENTS

| | | | |
|---|---|---|---|
| 6,018,360 A | 1/2000 | Stewart et al. |
| 6,032,051 A | 2/2000 | Hall et al. |
| 6,141,347 A | 10/2000 | Shaughnessy et al. |
| 6,331,983 B1 | 12/2001 | Haggerty et al. |
| 6,341,311 B1 | 1/2002 | Smith et al. |
| 6,377,991 B1 | 4/2002 | Smith et al. |
| 6,449,647 B1 | 9/2002 | Colby et al. |
| 6,493,715 B1 | 12/2002 | Funk et al. |
| 6,493,716 B1 | 12/2002 | Azagury et al. |
| 6,607,136 B1 | 8/2003 | Atsmon et al. |
| 6,735,201 B1 | 5/2004 | Mahajan et al. |
| 6,738,639 B1 | 5/2004 | Gosselin |
| 6,804,221 B1 | 10/2004 | Magret et al. |
| 6,804,738 B2 | 10/2004 | Weber |
| 6,951,020 B2 | 9/2005 | Ricciardi |
| 6,965,883 B2 | 11/2005 | Xu et al. |
| 6,967,949 B2 | 11/2005 | Davis et al. |
| 6,996,414 B2 | 2/2006 | Vishwanathan et al. |
| 7,054,938 B2 | 5/2006 | Sundqvist et al. |
| 7,061,880 B2 | 6/2006 | Basilier |
| 7,068,762 B2 | 6/2006 | Skladman et al. |
| 7,089,296 B2 | 8/2006 | Dai et al. |
| 7,149,514 B1 | 12/2006 | DePani et al. |
| 7,151,746 B2 | 12/2006 | Hiroki |
| 7,155,708 B2 | 12/2006 | Hammes et al. |
| 7,158,497 B2 | 1/2007 | Li et al. |
| 7,174,166 B2 | 2/2007 | Song et al. |
| 7,181,442 B2 | 2/2007 | Yeh et al. |
| 7,185,236 B1 | 2/2007 | Moser et al. |
| 7,246,172 B2 | 7/2007 | Yoshiba et al. |
| 7,272,652 B1 | 9/2007 | Keller-Tuberg |
| 7,295,525 B2 | 11/2007 | Shapiro et al. |
| 7,299,458 B2 | 11/2007 | Hammes |
| 7,302,691 B2 | 11/2007 | Masri et al. |
| 7,315,741 B2 | 1/2008 | Chun |
| 7,328,240 B2 | 2/2008 | El-Gebaly et al. |
| 7,339,903 B2 | 3/2008 | O'neill |
| 7,346,699 B1 | 3/2008 | Krause et al. |
| 7,349,837 B2 | 3/2008 | Martin et al. |
| 7,353,279 B2 | 4/2008 | Durvasula et al. |
| 7,362,757 B2 | 4/2008 | Griswold et al. |
| 7,363,034 B2 | 4/2008 | DePani et al. |
| 7,369,541 B2 | 5/2008 | Hundscheidt et al. |
| 7,424,007 B2 | 9/2008 | Meier et al. |
| 7,453,831 B2 | 11/2008 | Dorenbosch et al. |
| 7,471,645 B2 | 12/2008 | Torres et al. |
| 7,474,669 B2 | 1/2009 | Kamata et al. |
| 7,490,126 B2 | 2/2009 | Ozzie et al. |
| 7,499,466 B2 | 3/2009 | Hundscheidt et al. |
| 7,512,084 B2 | 3/2009 | Jalonen |
| 7,532,622 B2 | 5/2009 | Pung et al. |
| 7,546,082 B2 | 6/2009 | Chennikara et al. |
| 7,558,262 B2 | 7/2009 | Tonjes et al. |
| 7,562,375 B2 | 7/2009 | Barrett et al. |
| 7,603,454 B2 | 10/2009 | Piper |
| 7,606,186 B2 | 10/2009 | Hundscheidt et al. |
| 7,606,205 B2 | 10/2009 | Ranta-Aho et al. |
| 7,606,227 B2 | 10/2009 | Fukushima et al. |
| 7,620,045 B2 | 11/2009 | Igarashi et al. |
| 7,631,100 B2 | 12/2009 | Ben-Zvi et al. |
| 7,650,424 B2 | 1/2010 | Armitage |
| 7,672,327 B2 | 3/2010 | Kall et al. |
| 7,715,330 B2 | 5/2010 | Denecheau et al. |
| 7,746,799 B2 | 6/2010 | Kokot et al. |
| 7,756,072 B1 | 7/2010 | Fenner et al. |
| 7,792,860 B2 | 9/2010 | Shrivastava et al. |
| 7,796,539 B2 | 9/2010 | Denecheau et al. |
| 7,974,283 B2 | 7/2011 | Lee et al. |
| 8,010,688 B2 | 8/2011 | Onoda et al. |
| 8,060,598 B1 | 11/2011 | Cook et al. |
| 8,102,846 B2 | 1/2012 | Bijwaard et al. |
| 8,103,729 B2 | 1/2012 | Cohen et al. |
| 8,132,000 B2 | 3/2012 | Lebovitz et al. |
| 8,150,876 B2 | 4/2012 | Krishna |
| 2001/0032262 A1 | 10/2001 | Sundqvist et al. |
| 2002/0026525 A1 | 2/2002 | Armitage |
| 2002/0031107 A1 | 3/2002 | Li et al. |
| 2002/0037736 A1 | 3/2002 | Kawaguchi et al. |
| 2002/0091926 A1 | 7/2002 | Fukutomi |
| 2002/0150094 A1 | 10/2002 | Cheng et al. |
| 2002/0152299 A1 | 10/2002 | Traversat et al. |
| 2003/0005054 A1 | 1/2003 | El-Gebaly et al. |
| 2003/0009570 A1 | 1/2003 | Moskowitz et al. |
| 2003/0014488 A1 | 1/2003 | Dalal et al. |
| 2003/0016792 A1 | 1/2003 | Skladman et al. |
| 2003/0017836 A1 | 1/2003 | Vishwanathan et al. |
| 2003/0018715 A1 | 1/2003 | ONeill |
| 2003/0046440 A1 | 3/2003 | Ricciardi |
| 2003/0073453 A1 | 4/2003 | Basilier |
| 2003/0074507 A1 | 4/2003 | Weber |
| 2003/0145102 A1 | 7/2003 | Keller-Tuberg |
| 2003/0147392 A1 | 8/2003 | Hayashi et al. |
| 2003/0172165 A1 | 9/2003 | Xu et al. |
| 2003/0182140 A1 | 9/2003 | Furuya et al. |
| 2003/0211859 A1 | 11/2003 | Chen et al. |
| 2004/0001498 A1 | 1/2004 | Chen et al. |
| 2004/0059722 A1 | 3/2004 | Yeh et al. |
| 2004/0081125 A1 | 4/2004 | Ranta-Aho et al. |
| 2004/0083287 A1 | 4/2004 | Gao et al. |
| 2004/0088689 A1 | 5/2004 | Hammes |
| 2004/0090970 A1 | 5/2004 | Sanchez et al. |
| 2004/0132448 A1 | 7/2004 | Torres et al. |
| 2004/0213177 A1 | 10/2004 | Moritani et al. |
| 2004/0215714 A1 | 10/2004 | Dai et al. |
| 2004/0216044 A1 | 10/2004 | Martin et al. |
| 2004/0233907 A1 | 11/2004 | Hundscheidt et al. |
| 2004/0246984 A1 | 12/2004 | Hundscheidt et al. |
| 2004/0246985 A1 | 12/2004 | Kall et al. |
| 2004/0252690 A1 | 12/2004 | Pung et al. |
| 2004/0258003 A1 | 12/2004 | Kokot et al. |
| 2004/0264443 A1 | 12/2004 | Beck et al. |
| 2004/0264463 A1 | 12/2004 | Fukushima et al. |
| 2004/0266440 A1 | 12/2004 | Fuchs et al. |
| 2005/0007969 A1 | 1/2005 | Hundscheidt et al. |
| 2005/0018678 A1 | 1/2005 | Keller et al. |
| 2005/0038909 A1 | 2/2005 | Yoshiba et al. |
| 2005/0053068 A1 | 3/2005 | Toth et al. |
| 2005/0058085 A1 | 3/2005 | Shapiro et al. |
| 2005/0058118 A1 | 3/2005 | Davis et al. |
| 2005/0074015 A1 | 4/2005 | Chari et al. |
| 2005/0076145 A1 | 4/2005 | Ben-Zvi et al. |
| 2005/0081244 A1 | 4/2005 | Barrett et al. |
| 2005/0111474 A1 | 5/2005 | Kobayashi |
| 2005/0114537 A1 | 5/2005 | Griswold et al. |
| 2005/0120378 A1 | 6/2005 | Jalonen |
| 2005/0152366 A1 | 7/2005 | Heuck |
| 2005/0198261 A1 | 9/2005 | Durvasula et al. |
| 2005/0228857 A1 | 10/2005 | Ricciardi |
| 2005/0229180 A1 | 10/2005 | Ricciardi |
| 2005/0283447 A1 | 12/2005 | Xu et al. |
| 2005/0289096 A1 | 12/2005 | Trossen et al. |
| 2006/0007930 A1 | 1/2006 | Dorenbosch |
| 2006/0034278 A1 | 2/2006 | Hundscheidt et al. |
| 2006/0050659 A1 | 3/2006 | Corson et al. |
| 2006/0077895 A1 | 4/2006 | Wright |
| 2006/0184671 A1 | 8/2006 | Boys |
| 2006/0187950 A1 | 8/2006 | Bou-Diab et al. |
| 2006/0218147 A1 | 9/2006 | Shrivastava et al. |
| 2006/0268873 A1 | 11/2006 | Tonjes et al. |
| 2006/0274751 A1 | 12/2006 | Tsuchiya et al. |
| 2007/0081461 A1 | 4/2007 | Denecheau et al. |
| 2007/0121574 A1 | 5/2007 | Igarashi et al. |
| 2007/0195772 A1 | 8/2007 | Shadish |
| 2008/0056281 A1 | 3/2008 | Denecheau et al. |
| 2008/0062923 A1 | 3/2008 | Ponnuswamy |
| 2008/0080439 A1 | 4/2008 | Aziz et al. |
| 2008/0095108 A1 | 4/2008 | Malladi et al. |
| 2008/0123577 A1 | 5/2008 | Jaakkola et al. |

(56) References Cited

U.S. PATENT DOCUMENTS

| | | |
|---|---|---|
| 2008/0144559 A1 | 6/2008 | Griswold et al. |
| 2008/0151808 A1 | 6/2008 | ONeill |
| 2008/0291945 A1 | 11/2008 | Luo |
| 2009/0016345 A1 | 1/2009 | Tsuchiya et al. |
| 2009/0052362 A1 | 2/2009 | Meier et al. |
| 2009/0147781 A1 | 6/2009 | Lee et al. |
| 2009/0279701 A1 | 11/2009 | Moisand et al. |
| 2010/0043067 A1 | 2/2010 | Varadhan et al. |
| 2010/0256976 A1 | 10/2010 | Atsmon et al. |
| 2010/0265947 A1 | 10/2010 | Kokot et al. |
| 2011/0208860 A1 | 8/2011 | Sim et al. |

FOREIGN PATENT DOCUMENTS

| | | |
|---|---|---|
| JP | 2000059294 A | 2/2000 |
| JP | 2001320755 A | 11/2001 |
| JP | 2002199011 A | 7/2002 |
| JP | 2003158547 A | 5/2003 |
| JP | 2003273926 | 9/2003 |
| JP | 2003348149 | 12/2003 |
| JP | 2004187279 A | 7/2004 |
| JP | 2004228968 | 8/2004 |
| RU | 2154348 | 8/2000 |
| WO | 0165807 | 9/2001 |
| WO | WO-03019861 A2 | 3/2003 |
| WO | 03034658 A2 | 4/2003 |
| WO | 2004051926 A1 | 6/2004 |

OTHER PUBLICATIONS

International Search Report From International Application No. PCT/US2005/029086, pp. 1-2, Jan. 20, 2006.

Kaur, et al., "Multicast support for mobile IP using a modifed IGMP", 0311999, IEEE, pp. 948-952.

Supplementary European Search Report—EP05787520, Search Authority—Munich Patent Office, Sep. 30, 2010.

Written Opinion—PCT/US2005/029086, International Search Authority, European Patent Office, Jan. 20, 2006.

METHODS AND APPARATUS FOR MANAGING GROUP MEMBERSHIP FOR GROUP COMMUNICATIONS

RELATED APPLICATIONS

The present application is a continuation of U.S. patent application Ser. No. 11/204,769 entitled "METHODS AND APPARATUS FOR MANAGING GROUP MEMBERSHIP FOR GROUP COMMUNICATIONS," filed Aug. 16, 2005, which claimed priority to U.S. Provisional Patent Application No. 60/602,021 entitled "METHODS AND APPARATUS FOR MANAGING GROUP MEMBERSHIP FOR GROUP COMMUNICATIONS," filed Aug. 16, 2004. The present application incorporates by reference each of these applications.

FIELD OF THE INVENTION

This invention relates to communications systems and, more particularly, to methods and apparatus for managing group membership for group communications.

BACKGROUND

In a typical cellular communication network, a set of geographically dispersed base stations provide wireless access to a communications infrastructure. Users with wireless communication devices, or terminals, are able to establish a direct communication link with a suitable base station and then exchange information with other users and/or end systems throughout the communication network.

IP multicast technology provides an efficient packet delivery service for group communications (e. g., one-to-many or many-to-many). The use of IP multicast reduces the bandwidth utilization for group communications. This is especially important for supporting group communications over wireless media, where bandwidth is a scarce resource.

When using IP multicast, a group of recipients is associated with an IP multicast address. A data source addresses and sends a single copy of each IP datagram intended for the group of recipients to the IP multicast group address. The routed network will replicate and forward each datagram as needed to deliver it to the routers interconnecting all of the group members. Specialized IP multicast routing protocols are used to form the delivery trees needed for copying and forwarding multicast datagrams. IP multicast is a receiver-oriented service, in that receivers join a given multicast group to receive datagrams sent to the corresponding IP multicast group address. End systems and access routers communicate with each other via a group membership protocol, e.g., Internet Group Management Protocol (IGMP), to enable the access router to maintain information on active multicast group membership necessary for building the delivery trees.

SUMMARY OF THE INVENTION

The present invention is directed to methods and apparatus for implementing group communications, e.g., multicast communications methods and apparatus. The methods and apparatus of the invention are directed to the subject matter described and claimed in the present application.

The methods and apparatus of the present invention are particularly well suited for use in wireless communications systems. In such systems different end nodes, which may be wireless terminals used by different individual users, have different communications requirements, e.g., power, coding rate, modulation, timing and/or other signal requirements. These differing signal requirements are often a function of differences in channel conditions and/or end node location which exist between different end nodes and an access node. The conditions, including channel condition and location, can change over time and as an end node moves within the coverage area of an access node. Each end node may be a member of zero, one, or more multicast groups at any point in time. Access nodes serve as the end node's point of attachment, e.g., via a wireless communications link, to a communication system, e.g., cellular network. Group membership can vary with time.

Different multicast applications can be executing on different end nodes with each end node being a member of one, multiple or no multicast groups at any point in time. Within an area serviced by a transmitter, e.g., access node's sector or cell transmitter, group membership may change due to actions by the group member(s), e.g., as a user of an end node decides to enter or exit a group, e.g., by signaling a multicast application to make the desired group membership change or by terminating the multicast application. Membership can also change as the result of an end node dynamics, e.g., a mobile node, entering or leaving a cell.

In one exemplary system, end nodes with wireless transmitters and receivers interact with an access node, e.g., a base station which serves as the end node's network point of attachment. While remaining within the range of a transmitter, e.g., an access node's cell or sector transmitter, the end node can voluntarily join or leave multicast groups. At the wireless terminal, joining and/or leaving groups can be controlled by multicast applications which are responsive to user input, e.g., signals to a multicast application generated by a user depressing a key or generating a wireless terminal input signal using another type of input device. A user's desire to join or leave a multicast group, in accordance with the present invention, can be signaled to the access node to which the end node is coupled by a wireless communications link.

The access node can decide to grant and/or reject an end node's request to be added to a multicast group, e.g., based on service information stored at the access node or available to the access node, e.g., from an Authentication Accounting and Authorization (AAA) server. For example, if a wireless terminal is not authorized, e.g., does not subscribe, to a multicast service corresponding to the group the wireless terminal is attempting to join, the request to be added to the group may, and often will be, denied by the access node.

In a wireless environment, where transmission bandwidth and other transmission resources are limited and often relatively costly as compared to wired communications systems, for system efficiency and resource allocation purposes, accurate multicast group membership information can be very useful. For example, it is undesirable and wasteful to be transmitting multicast messages to members of a group when there are no longer any members of the group within the Access node's coverage area. Accordingly, accurate and timely multicast group membership information is important for efficient access node operation in a wireless environment. Accurate and timely multicast group membership information also enables optimization of multicast transmissions to the set of group members.

Unfortunately, known multicast communications protocols tend to provide relatively limited information about group membership at a particular access node, e.g., edge router. Generally, when using the known group communications methods without the invention, the set of end nodes included in a multicast group are not reliably known, and thus multicast transmission must be targeted to reach a pre-determined coverage area. In addition, the updating of this information may be on a time scale which is relatively slow and can lead to waste in a wireless environment due to signals being transmitted to end nodes which are no longer in the access node's coverage area.

The methods and apparatus of the present invention are directed to improved multicast communications techniques. Various features of the present invention are directed to improving the timeliness, reliability and amount of information available at an access node regarding multicast group members which use the access node as their point of network attachment. Some of these features are achieved through the use of one or more signaling methods of the present invention. In addition to novel multicast signaling to and/or from end nodes which are used to provide group membership information at an access node, an access node can use handoff and/or other types of information to generate and/or update multicast group membership information at the access node. For example, when a handoff occurs from one access node to another, the access node from which the handoff occurs may update its group membership information to remove the wireless terminal which is being handed off from multicast group membership lists maintained at the access node. The access node which serves as the wireless terminal's new network point of attachment may update its multicast group membership information based on information communicated as part of the handoff operation or received from a core state management node as part of a handoff operation.

In accordance with one exemplary embodiment of the invention, novel group communications signaling is used between a wireless interface at an end node, e.g., wireless terminal, and an access node. The signaling is designed to provide the access node accurate and reliable multicast group membership information and to provide confirmation to the end node regarding the acceptance/rejection of requested group membership. In the exemplary embodiment a wireless interface is used by an end node to transmit signal to and receive signals from the access node. The wireless interface may be internal to the end node, external to the end node and coupled to the end node by a connection, or partially internally to the end node, e.g., as may be the case where the wireless interface is implemented as a card which can be partially inserted into the end node, e.g., a notebook computer or PDA. In some embodiments, the wireless interface serves a single end node and is coupled to one or more internal components of the end node by a physical, e.g., wired, as opposed to wireless, connection. The end node in various embodiments includes a group communications module to which the wireless interface is coupled, e.g., by a wired connection.

In accordance with the exemplary embodiment of the invention, the wireless interface used by an end node is used to transmit a group membership information change request signal to the access node when the wireless terminal seeks to be added or removed from a multicast group. This may be, e.g., in response to a signal generated by one or more multicast applications executed in the end node, e.g., which operate in response to input received from a user of the end node.

The group membership information change request signal includes, in some embodiments, an end node identifier, a multicast group identifier and information indicating whether the end node is seeking to be added or removed from the multicast group corresponding to the group identifier included in the message.

In response to receiving a group membership information change request signal, if the signal requests that the end node be added to a multicast group, the access node receiving the signal will, in some embodiments, determine if the end node sending the message is authorized to be a member of the indicated group.

If the end node is authorized to be a member of the group, the access node will add the end node to a group membership list which lists the members of the multicast group which are using said access node to receive group signals. Different membership lists are maintained at the access node for different multicast groups. An end node can be a member of one, multiple, or no multicast groups at any point in time. Assuming the access node adds the end node to the group membership list as requested, the Access Node will transmit a response signal to the end node indicating that its request to be added to the group has been granted.

If the end node is not authorized to be a member of the group indicated in the request signal, the access node will not add the end node to the group membership list corresponding to the group identified in the request message. Different membership lists are maintained at the access node for different multicast groups. In the case where the end node is not authorized to be added to the group as requested, the Access Node will respond to the request by transmitting a response signal to the end node indicating that its request to be added to the group has been denied.

In various exemplary embodiments, a group communication module in the end node monitors for receipt by the wireless interface module of a response to each group membership information change request signal transmitted for said end node. In some embodiments, the group communications module directs the wireless interface module to retransmit the group membership information change request signal when a response has not been received by the wireless interface module in a pre-selected period of time in which a response to the request would normally be expected to be received. This time may vary depending on the particular system implementation but is usually a set period of time.

The group membership information change request signal is often generated, either directly or indirectly, in response to information supplied by a multicast group communication application operating, e.g., executed by, said end node. The multicast group communication application may interact directly with the group communications module. Alternatively, a standard group membership client module which implements standard multicast signaling when interacting with one or more multicast group communications applications operates as an interface between the applications and the group communications module of the present invention. Thus, the methods of the present invention can be used with conventional group communications applications without requiring them to support group communications signaling in accordance with the present invention. In such embodiments, the standard group membership client module serves to convert between standard group communication protocol signaling and the novel request and optional response signaling used in accordance with the present invention.

Given that a response to a request to be added to a group is generated, both the access node and the end nodes in a system implementing the present invention are provided with reliable group membership information.

While in some scenarios the group membership signaling of the present invention may involve more signaling than some known group communications protocols, it has the potential to reduce and/or eliminate unnecessary wireless transmission of multicast signals which may occur in known systems due to the unreliability and lack of detailed information regarding group membership at an access node.

As will be discussed in the detailed description below, detailed group membership information at an access node offers numerous additional benefits in terms of the allocation and use of limited wireless communications resources available at the access node.

Numerous variations on the above described methods and apparatus of the present invention are possible. The detailed description which follows provides additional description of the invention as well as discussing additional exemplary embodiments, features and benefits of the invention.

DETAILED DESCRIPTION OF THE FIGURES AND THE INVENTION

Figure 1:
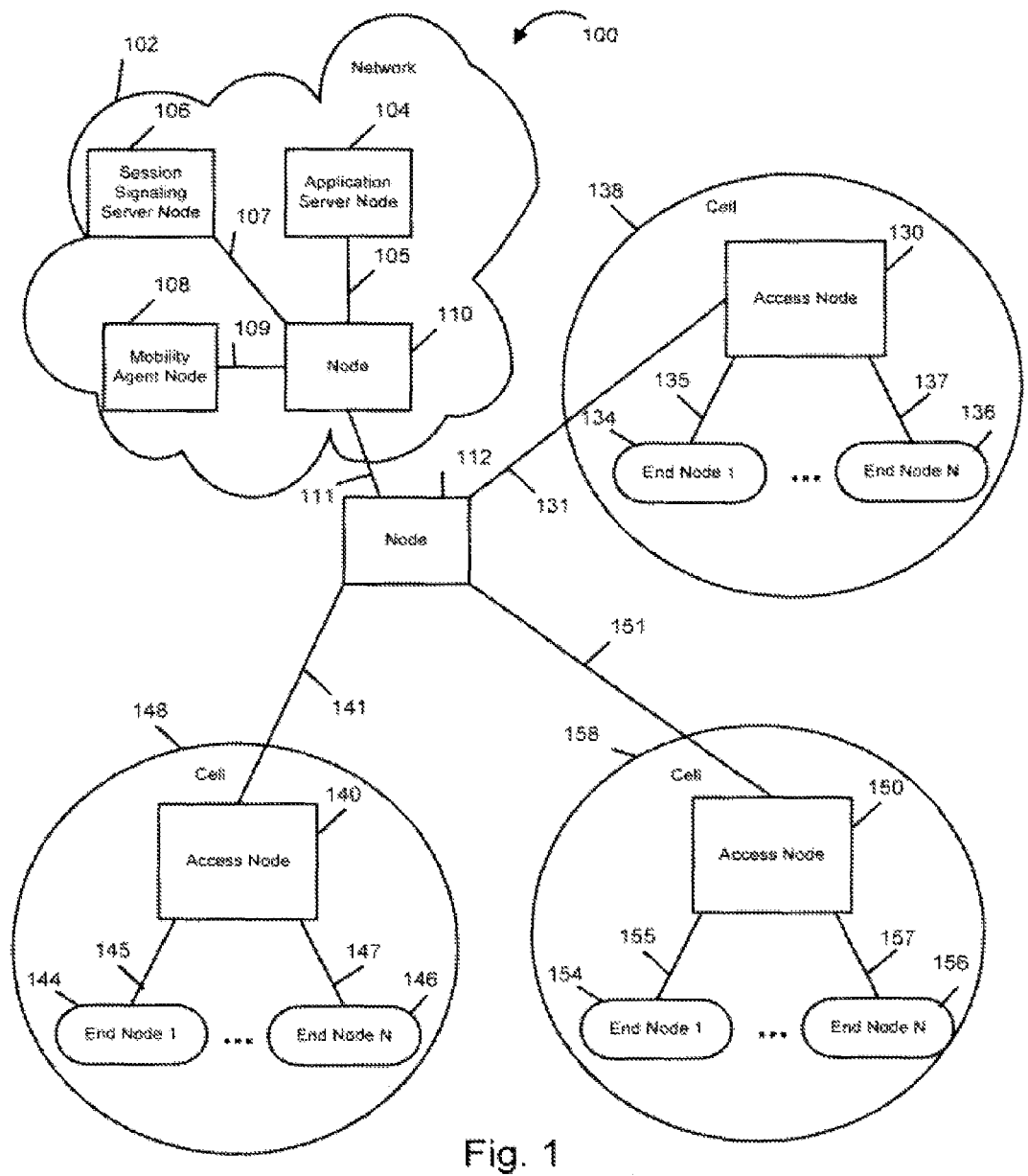
FIG. 1 illustrates a network diagram of an exemplary communications system of the present invention.

FIG. 1 illustrates an exemplary communication system 100, e.g., a cellular communication network, which comprises a plurality of nodes interconnected by communications links. Nodes in the exemplary communication system 100 may exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of end nodes 134, 136, 144, 146, 154, 156, which access the communication system via a plurality of access nodes 130, 140, 150. The end nodes 134, 136, 144, 146, 154, 156 may be, e.g., wireless communication devices or terminals, and the access nodes 130, 140, 150 may be, e.g., wireless access routers or base stations. The exemplary communication system 100 also includes a number of other nodes as may be needed to provide interconnectivity or to provide specific services or functions. Specifically, the exemplary communication system 100 includes a mobility agent node 108, e.g., Mobile IP home agent node, as may be needed to support mobility of end nodes between access nodes, a session signaling server node 106, e.g., Session Initiation Protocol (SIP) proxy server, as may be needed to support establishment and maintenance of communication sessions between end nodes, and an application server node 104, e.g., multimedia server, as may be needed to support specific application layer services.

The FIG. 1 exemplary communication system 100 depicts a network 102 that includes the application server node 104, the session signaling server node 106, and the mobility agent node 108, each of which is connected to an intermediate network node 110 by a corresponding network link 105, 107, 109, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 130, 140, 150 via network links 131, 141, 151, respectively.

Each access node 130, 140, 150 is depicted as providing connectivity to a plurality of N end nodes (134, 136), (144, 146), (154, 156), respectively, via corresponding access links (135, 137), (145, 147), (155, 157), respectively. In the exemplary communication system 100, each access node 130, 140, 150 is depicted as using wireless technology, e.g., wireless access links, to provide access. A radio coverage area, e.g., communications cell, 138, 148, 158 of each access node 130, 140, 150, respectively, is illustrated as a circle surrounding the corresponding access node.

The exemplary communication system 100 is subsequently used as a basis for the description of an embodiment of the invention. Alternative embodiments of the invention include various network topologies, where the number and type of network nodes, the number and type of links, and the interconnectivity between nodes may differ from that of the exemplary communication system 100 depicted in FIG. 1.

Figure 2A:
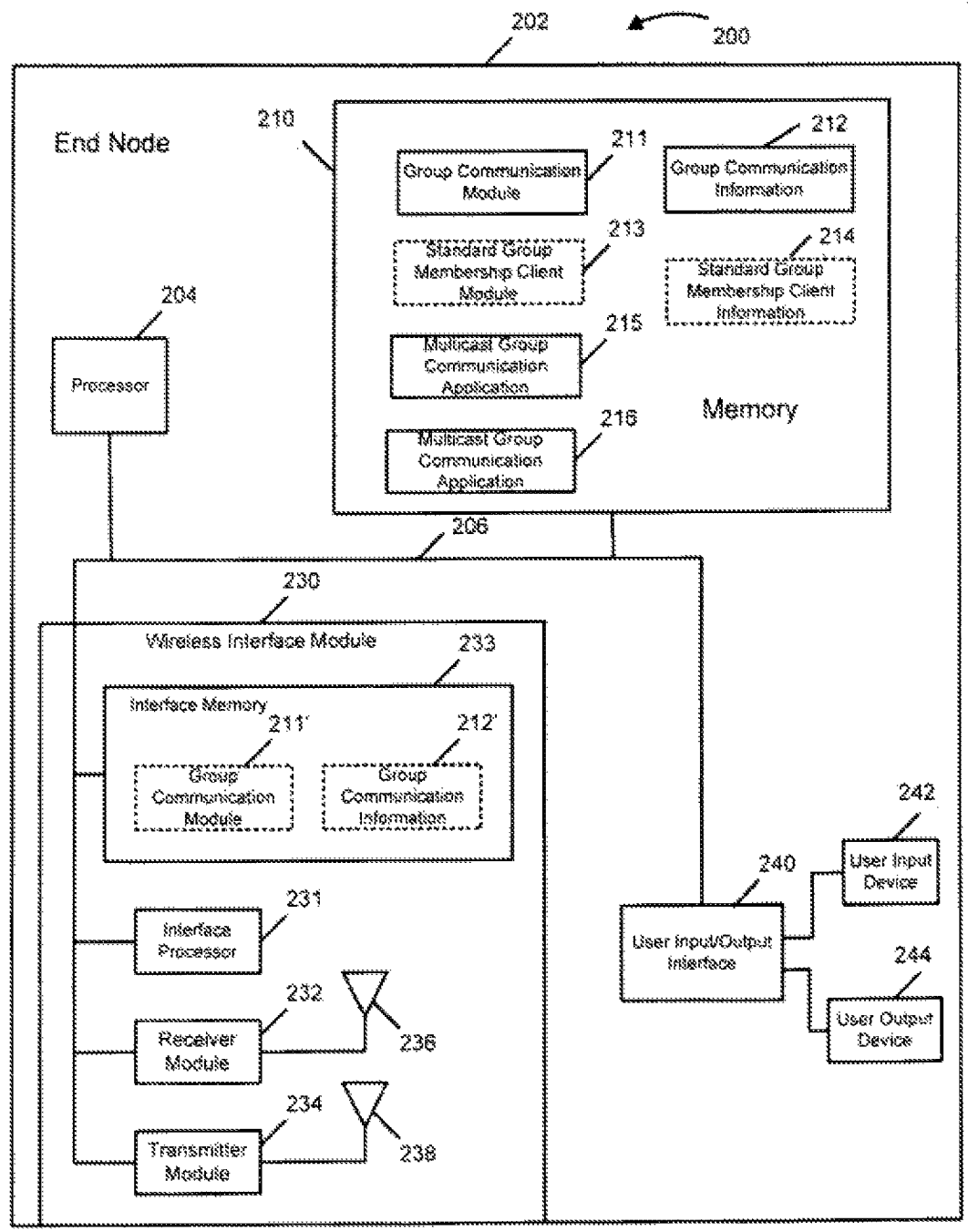
FIGS. 2A, 2B and 2C illustrate apparatus, e.g., exemplary end nodes, implemented in accordance with the present invention.
Figure 2B:
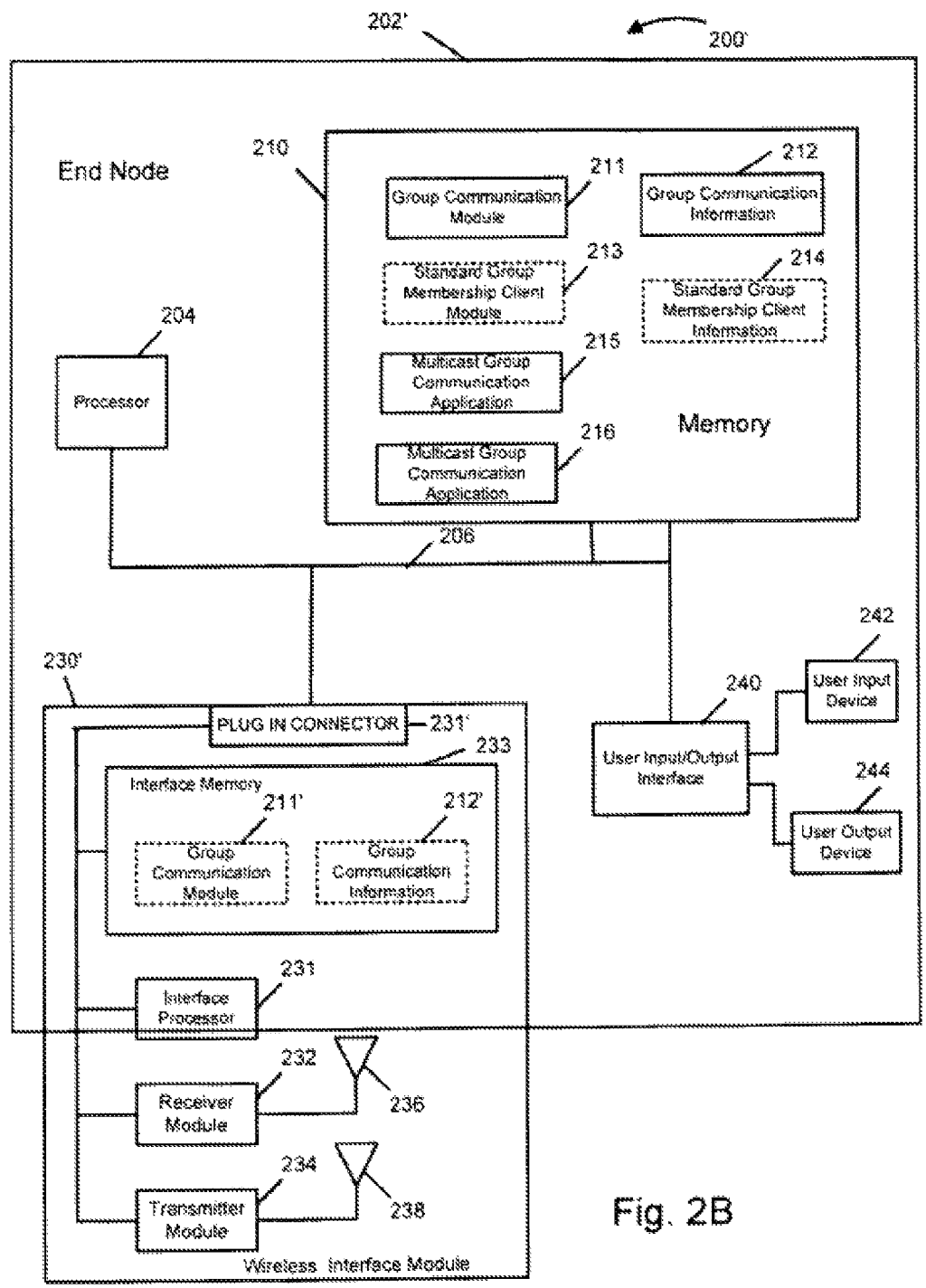
Figure 2C:
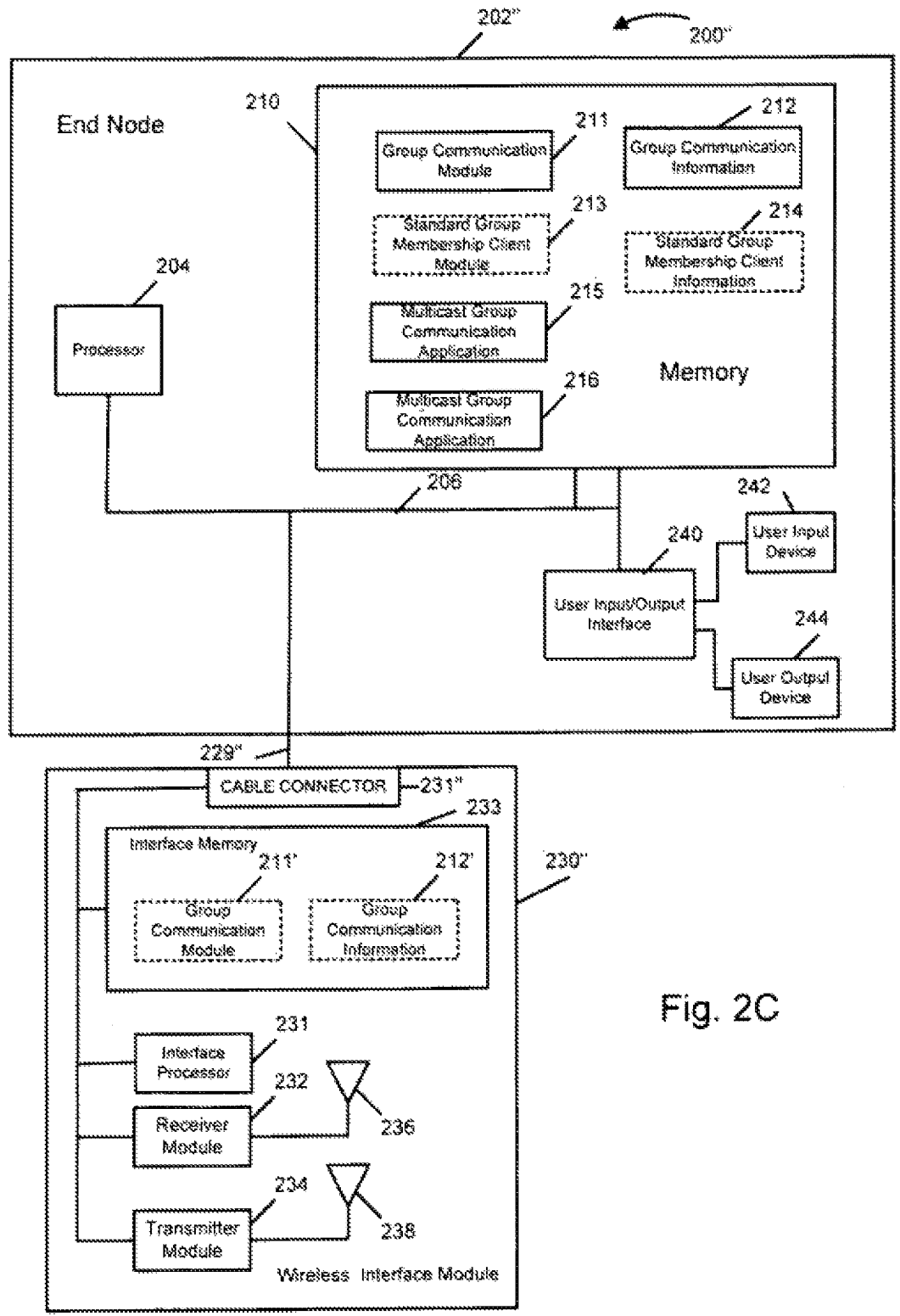

FIGS. 2A, 2B and 2C illustrate apparatus, e.g., exemplary end nodes with a wireless communications interface module, capable of supporting group communications signaling in accordance with the present invention. Items identified in FIGS. 2A, 2B, and 2C identified with the same reference numbers can be implemented using the same or similar elements.

FIG. 2A provides a detailed illustration of an exemplary end node 200 implemented in accordance with an embodiment of the present invention. In the FIG. 2A embodiment, a wireless interface module 230, which in some embodiments is a wireless communications interface module, is shown as an internal component of the node 200. The wireless communications interface module 230 may be, and sometimes is, hardwired to other elements in the end node 200. The exemplary end node 200, depicted in FIG. 2A, is a detailed representation of an apparatus that may be used as any one of the end nodes 134, 136, 144, 146, 154, 156, depicted in FIG. 1. In the FIG. 2A embodiment, the end node 200 includes a processor 204, a wireless communication interface module 230, a user input/output interface 240 and memory 210 coupled together by bus 206. Accordingly, via bus 206 the various components of the end node 200 can exchange information, signals and data. The components 204, 206, 210, 240 of the end node 200 are located inside a housing 202. In some embodiments of the present invention, at least a portion of the wireless interface module 230 is located in the end node housing. In other embodiments, e.g., as in the FIG. 2C example, the wireless interface module is external from the end node housing and coupled to the end node by a communication connection, e.g., via copper wires or a cable. In other embodiments such as shown in FIG. 2B, the wireless communications module is implemented as a plug in card, e.g., a PCMCIA card, which can be inserted and removed from the end node by a user through an opening in the end node housing 202.

The processor 204 under control of various modules, e.g., routines, included in memory 210 controls operation of the end node 200 to perform various signaling and processing as discussed below. The modules included in memory 210 are executed on startup or as called by other modules. Modules may exchange data, information, and signals when executed. Modules may also share data and information when executed.

The wireless interface module 230 provides a mechanism by which the internal components of the end node 200 can send and receive signals to/from external devices and network nodes, e.g., access nodes. The wireless communication interface module 230 includes, e.g., a receiver module, e.g., circuit, 232 with a corresponding receiving antenna 236 and a transmitter module, e.g., circuit, 234 with a corresponding transmitting antenna 238 used for coupling the end node 200 to other network nodes, e.g., via wireless communications channels. In some embodiments of the present invention, the wireless communication interface module 230 includes an interface processor 231 and interface memory 233, as depicted in FIG. 2. The interface processor 231 under control of various modules, e.g., routines, included in interface memory 233 controls operation of the wireless communication interface module 230 to perform various signaling and processing as discussed below. The modules included in interface memory 233 are executed on startup or as called by other modules. Modules may exchange data, information, and signals when executed. Modules may also share data and information when executed.

The exemplary end node 200 also includes a user input device 242, e.g., keypad, and a user output device 244, e.g., display, which are coupled to bus 206 via the user input/output interface 240. Thus, user input/output devices 242, 244 can exchange information, signals and data with other components of the end node 200 via user input/output interface 240 and bus 206. The user input/output interface 240 and associated devices 242, 244 provide a mechanism by which a user can operate the end node 200 to accomplish certain tasks. In particular, the user input device 242 and user output device 244 provide the functionality that allows a user to control the end node 200 and applications, e.g., modules, programs, routines and/or functions, that execute in the memory 210 of the end node 200.

In the FIG. 2A embodiment, the end node memory 210 includes one or more multicast group communication applications 215, 216. Some end node embodiments implemented in accordance with the present invention also include a standard group membership client module 213 and corresponding standard group membership client information 214. The standard group membership client module 213 may support any one of a variety of group management protocols, e.g., Internet Group Management Protocol (IGMP), Multicast Listener Discovery (MLD), etc. In end node embodiments that include a standard group membership client module 213, multicast group communication applications 215, 216 may indicate group communication requirements (e.g., multicast groups for which the application should receive traffic) to the standard group membership client module 213 via an application programming interface (API) and interface memory 233 including one or more modules that implement various aspects of the present invention. In various embodiments the standard group membership client module 213 may interact with the group communication module 211 and/or 211' using IGMP or MLD compliant signaling with the group communication module 211 or 211' then acting as a proxy and generating non-IGMP and non-MLD compliant group membership change request signals which are transmitted by the transmitter included in the wireless communication interface module 230. Thus, in some embodiments which include a standard group membership client module 213, the group communication module 211', 211 which is coupled thereto serves as a proxy with the standard group membership client module 213 allowing for applications to interact with the group membership client module 213 using standard API's and conventional signaling.

In the FIG. 2A embodiment, the end node memory 210 and interface memory 233 further include a group communication module 211/211' and group communication information 212/212' that implement various aspects of the present invention. In accordance with the present invention, the group communication module 211/211' and group communication information 212/212' may be implemented either in the end node memory 210 (as indicated by the blocks labeled 211, 212) or in the interface memory 233 (as indicated by the blocks labeled 211', 212'). The group communication module 211/211' exchanges group membership information signaling with an access node, e.g., to control joining and leaving of multicast groups. The multicast group communication applications 215, 216 may indicate group communication requirements (e.g., multicast groups for which the application should receive traffic) to the group communication module 211/211' via an application programming interface (API). In end node embodiments that include a standard group membership client module 213, the group communication module 211/211' may receive (e.g., intercept) group membership signaling directed towards an access node by said standard group membership client module 213, and the group communication module 211/211' may also proxy group membership signaling as would be directed from an access node to said standard group membership client module 213.

The FIG. 2B embodiment is similar to the FIG. 2A embodiment. However, in FIG. 2B the end node 200' includes an end node housing 202' with an opening through which the wireless interface module 230', which is implemented in this embodiment as a plug in card, can be inserted. As illustrated, when fully inserted, a portion of the card 230' extends beyond the housing 202' allowing for wireless signals to be transmitted and received without being shielded by said housing. The card 230' is coupled to the bus 206 in the FIG. 2B embodiment by a plug in connector 231' which allows for the card to make electrical contact with the bus 206 but still allows the card 230' to be inserted and removed by the user without having to take apart the housing 202'.

FIG. 2C illustrates an embodiment where the wireless interface module 230" is implemented as an external device which is coupled to the end node 200" by a cable 229" and a cable connector 231". In the FIG. 2C embodiment, the wireless interface module 230" can be easily connected and disconnected by simply detaching the cable 229" from the connector 231". The FIG. 2C implementation is well suited for devices such as personal computers, etc. which do not include an available slot or opening for insertion of a card of the type shown in the FIG. 2B embodiment.

Figure 3:
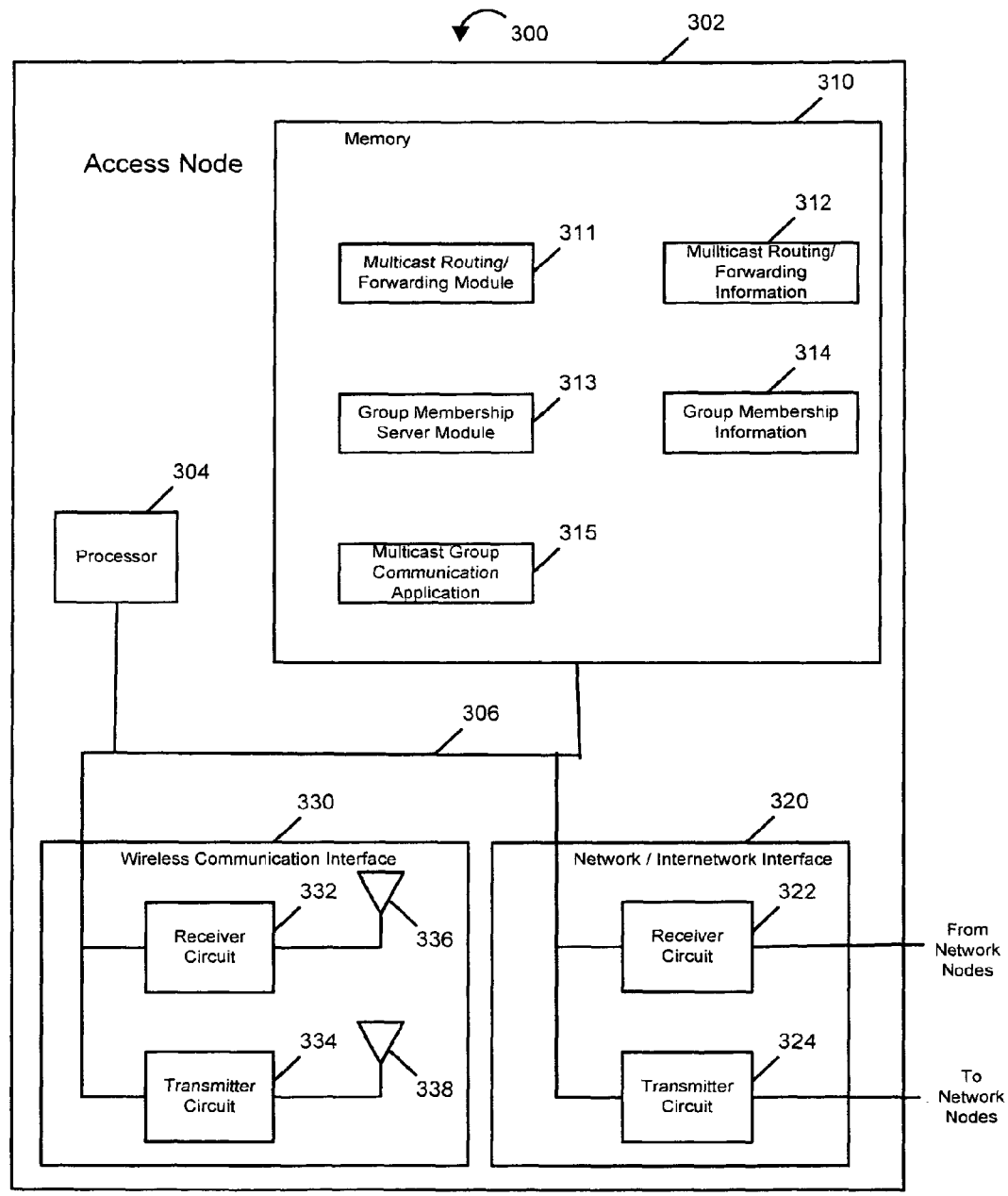
FIG. 3 illustrates an exemplary access node implemented in accordance with the present invention.

FIG. 3 provides a detailed illustration of an exemplary access node 300 implemented in accordance with the present invention. The exemplary access node 300, depicted in FIG. 3, is a detailed representation of an apparatus that may be used as any one of the access nodes 130, 140, 150, depicted in FIG. 1. In the FIG. 3 embodiment, the access node 300 includes a processor 304, a network/internetwork interface 320, a wireless communication interface 330 and memory 310, coupled together by bus 306. Accordingly, via bus 306 the various components of the access node 300 can exchange information, signals and data. The components 304, 306, 310, 320, 330 of the access node 300 are located inside a housing 302.

The processor 304 under control of various modules, e.g., routines, included in memory 310 controls operation of the access node 300 to perform various signaling and processing, as discussed below. The modules included in memory 310 are executed on startup or as called by other modules. Modules may exchange data, information, and signals when executed. Modules may also share data and information when executed.

The network/internetwork interface 320 provides a mechanism by which the internal components of the access node 300 can send and receive signals to/from external devices and network nodes. The network/internetwork interface 320 includes a receiver circuit 322 and a transmitter circuit 324 used for coupling the node 300 to other network nodes, e.g., via copper wires or fiber optic lines. The wireless communication interface 330 also provides a mechanism by which the internal components of the access node 300 can send and receive signals to/from external devices and network nodes, e.g., end nodes. The wireless communication interface 330 includes, e.g., a receiver circuit 332 with a corresponding receiving antenna 336 and a transmitter circuit 334 with a corresponding transmitting antenna 338 used for coupling the access node 300 to other network nodes, e.g., via wireless communication channels.

In the FIG. 3 embodiment, the memory 310 of the access node 300 includes a multicast routing/forwarding module 311, multicast routing/forwarding information 312, a group membership server module 313, group membership information 314, and a multicast group communication application 315.

The multicast routing/forwarding module 311 controls the operation of the access node 300 to support routing/forwarding of multicast traffic packets. The multicast routing/forwarding module 311 may use any one of a variety of multicast routing protocols, e.g., Distance Vector Multicast Routing Protocol (DVMRP), Protocol Independent Multicast (PIM), etc. The multicast routing/forwarding information 312 includes, e.g., the multicast routing and/or forwarding tables indicating the interfaces between which multicast packets corresponding to specific groups should be copied and forwarded.

The group membership server module 313 controls the operation of the access node 300 to support managing group membership information on interfaces of the access node 300. The group membership information 314 includes, e.g., the set of groups for which there are active members connected to the access node 300 via the wireless communication interface 330, specific information pertaining to each such group, and specific information pertaining to each group member connected to the access node 300 via the wireless communication interface 330. The group membership server module 313 exchanges group membership information signaling with end nodes, e.g., to control joining and leaving of multicast groups. In accordance with the present invention, the group membership server module 313 in the access node 300 exchanges group membership information signaling with the group communications module 211 in the end node 200.

Figures 4, 5:
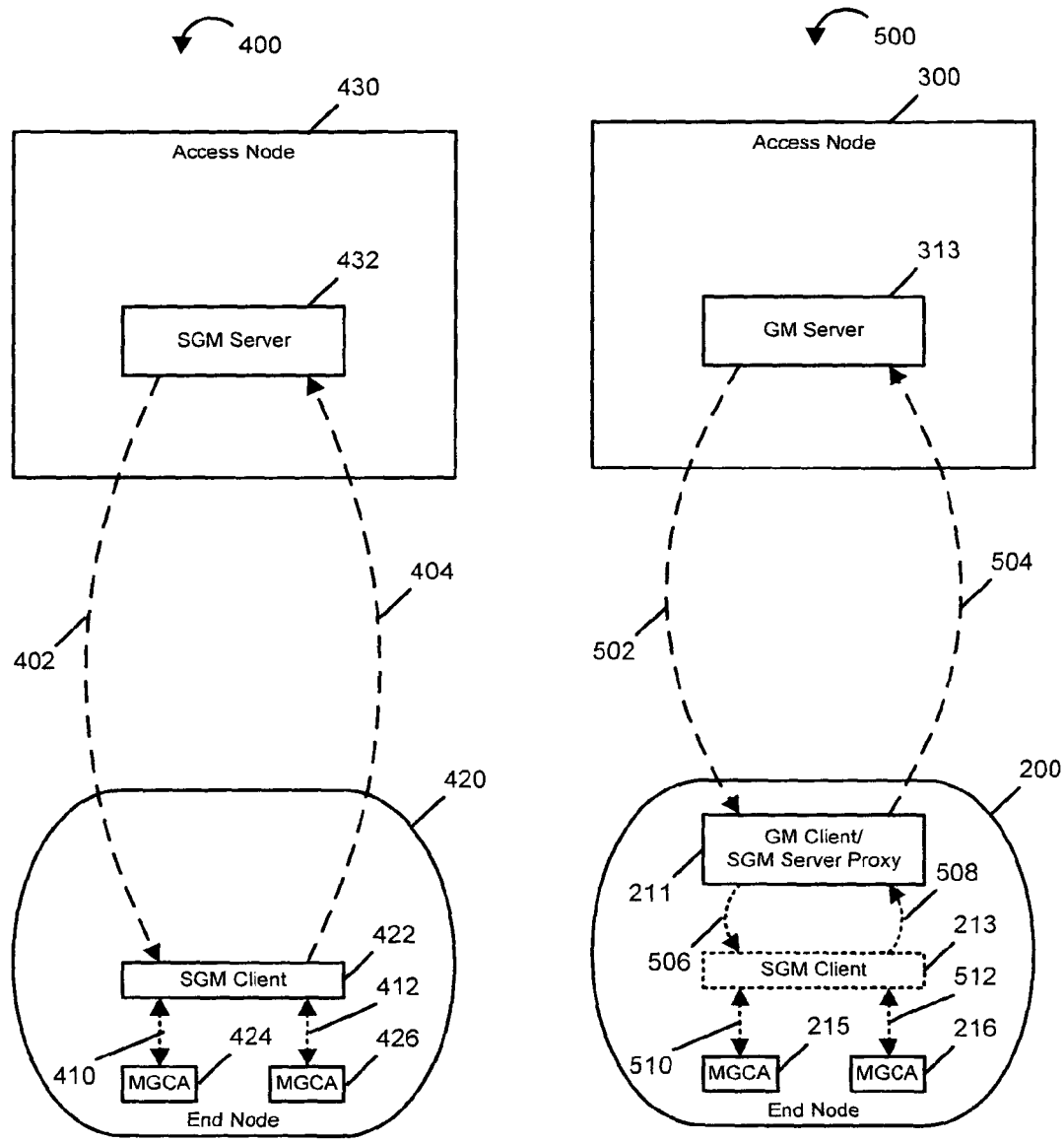
FIG. 4 illustrates the functional entities typically associated with group membership signaling between an access node and an end node.
FIG. 5 illustrates the functional entities associated with group membership signaling between an access node and an end node implemented in accordance with the invention.

FIG. 4 illustrates the functional entities typically associated with group membership signaling between a traditional access node and a traditional end node as a basis for comparison with the present invention. The FIG. 4 block diagram 400 includes a traditional access node 430 and a traditional end node 420. The access node 430 includes a standard group membership server module 432. The end node 420 includes a standard group membership client module 422 and one or more multicast group communication applications 424, 426. The multicast group communication applications 424, 426 indicate group communication requirements (e.g., multicast groups for which the application should receive traffic) to the standard group membership client module 422 via an API, 410, 412. For example, when an application starts a session associated with a particular multicast group, the application (e.g., 424) indicates to the standard group membership client module 422 via the API (e. g., 410) a requirement to join the particular group so that the application can receive traffic destined to the multicast group.

The standard group membership client module 422 in the end node 420 exchanges group membership information signaling 402, 404 with standard group membership server module 432 in the access node 430, e. g., to relay group membership information learned via the API from applications to the access node 430. The signaling 402, 404 between the standard group membership client module 422 and the standard group membership server module 432 may be in accordance with any one of a variety of group management protocols, e.g., Internet Group Management Protocol (IGMP), Multicast Listener Discovery (MLD), etc. The signaling 402, 404 enables the access node 430 to determine if there are members associated with particular multicast groups connected via a particular interface of the access node 430, such that the access node 430 can execute the procedures to establish and maintain multicast routing/forwarding as needed. Note that standard group membership signaling approaches do not ensure that the access node can determine the number of members associated with a particular multicast group, nor enable an access node to maintain an explicit list of group members associated with a particular group. Additionally, standard group membership signaling approaches do not provide confirmation to the end node that group membership requirements have been received and/or accepted by the access node.

FIG. 5 illustrates the functional entities associated with group membership signaling between an access node and an end node implemented in accordance with the present invention. The FIG. 5 block diagram 500 includes an access node 300 implemented in accordance with the present invention and an end node 200 implemented in accordance with the present invention. The access node 300 and end node 200 depicted in FIG. 5 are simplified representations of those depicted in FIG. 3 and FIG. 2, respectively. The access node 300 includes a group membership server module 313. The end node 200 includes a group communication module 211 and one or more multicast group communication applications 215, 216. Some end node embodiments further include a standard group membership client 213. In end node embodiments that include a standard group membership client 213, the multicast group communication applications 215, 216 indicate group communication requirements (e.g., multicast groups for which the application should receive traffic) to the standard group membership client module 213 via an API, 510, 512. For example, when an application starts a session associated with a particular multicast group, the application (e.g., 215) indicates to the standard group membership client module 213 via the API (e.g., 510) a requirement to join the particular group so that the application can receive traffic destined to the multicast group.

The standard group membership client module 213 in the end node 200 sends and receives group membership information signaling 508, 506, e.g., intended to relay group membership information learned via the API from applications to the access node 300. In accordance with the present invention, said signaling is exchanged between the standard group membership client module 213 and the group communication module 211. Thus, the group communication module 211 receives (e.g., intercepts) group membership signaling directed towards an access node by the standard group membership client module 213, and the group communication module 211 serves as a proxy for group membership signaling as would be directed from an access node to said standard group membership client module 213.

The signaling 506, 508 exchanged between the standard group membership client module 213 and the group communication module 211 may be based on any one of a variety of group management protocols, e. g., Internet Group Management Protocol (IGMP), Multicast Listener Discovery (MLD), etc. Said signaling 506, 508 enables the group communication module 211 to determine group communication requirements (e.g., multicast groups for which the applications should receive traffic) learned by the standard group membership client module 213 via the API 510, 512 from multicast group communication applications 215, 216. In embodiments that do not include a standard group membership client module 213, the multicast group communication applications 215, 216 indicate group communication requirements (e.g., multicast groups for which the application should receive traffic) directly to the group communication module 211 via an API.

The group communication module 211 in the end node 200 exchanges signaling 502, 504 with the group membership server module 313 in the access node 300. The signaling 502, 504 enables the end node 200, e.g., to indicate group membership requirements and information to the access node 300. Thus, the access node 300 can determine if there are members associated with particular multicast groups connected via a particular interface of the access node 300, such that the access node 300 can execute the procedures to establish and maintain multicast routing/forwarding as needed. In some but not necessarily all embodiments, the access node 300 determines the number of members associated with a particular multicast group and stores that number in memory. Additionally, the signaling 502, 504 between the group communication module 211 and the group membership server module 313, enables the access node 300 to maintain an explicit list of group members associated with a particular group and provides confirmation to the end node 200 that group membership requirements have been received and/or accepted by the access node 300.

Figure 6:
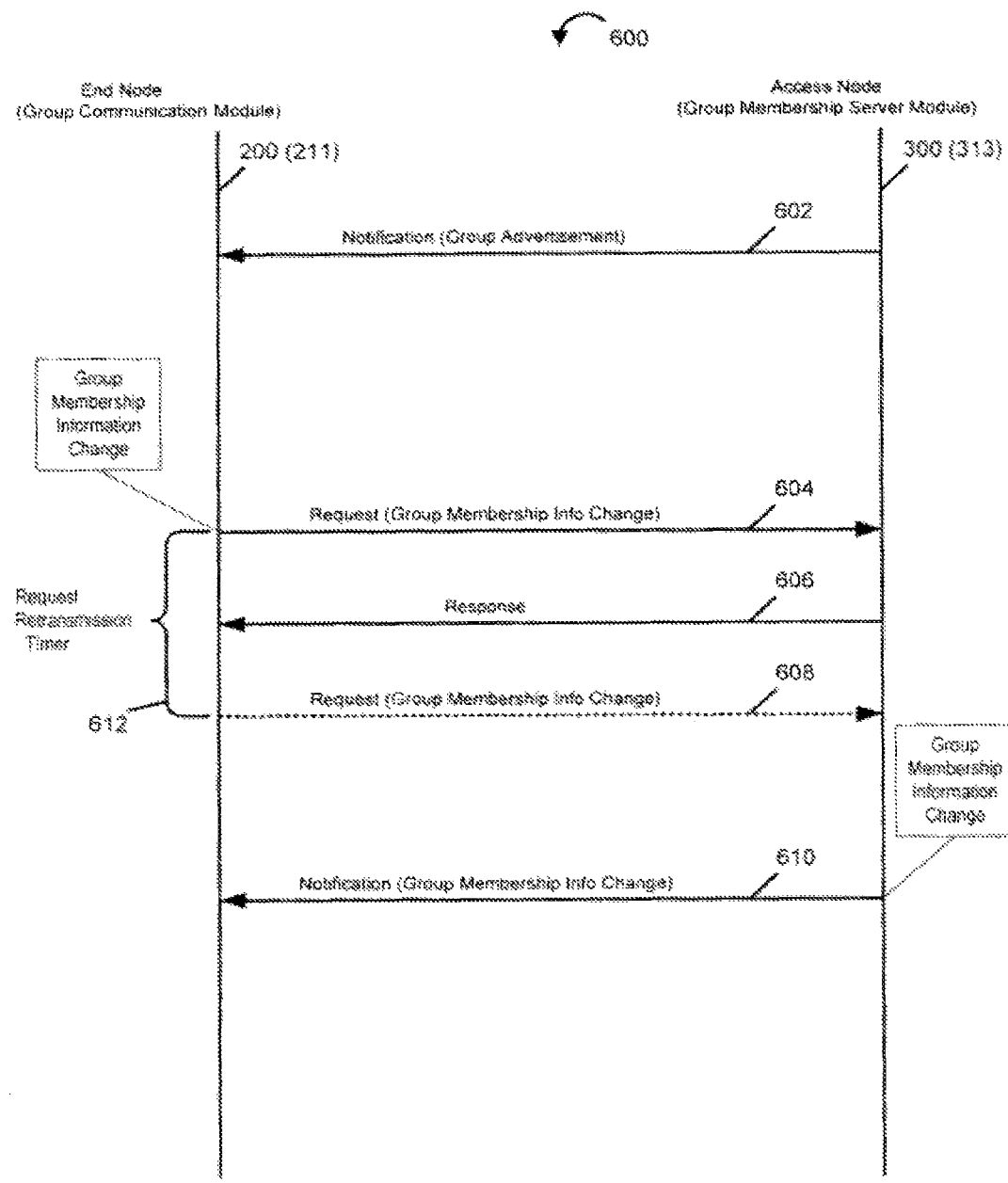
FIG. 6 illustrates exemplary group membership signaling between an access node and an end node implemented in accordance with the invention.

FIG. 6 depicts a message flow diagram 600 illustrating exemplary signaling exchanged between the group communication module 211 associated with an end node 200 implemented in accordance with the invention and the group membership server module 313 in an access node 300 implemented in accordance with the invention. In the FIG. 6 example, the group membership server module 313 sends a Notification (Group Advertisement) signal 602 to the group communication module 211. This notification signal includes, e.g., a list of supported multicast groups used for services supported by the network to which the access node 300 is interconnected. The Notification (Group Advertisement) signal may be transmitted via the wireless communication interface 330 in the access node 300 using either unicast (e.g., directed to a particular end node) or multicast (e.g., directed to a plurality of end nodes). In some embodiments, the Notification (Group Advertisement) signal 602 is periodically sent by the group membership server module 313 in an access node 300 to one or more end nodes connected to said access node 300. In some embodiments, the Notification (Group Advertisement) signal 602 is sent by the group membership server module 313 in an access node 300 to one or more end nodes connected to said access node 300 in response to receiving a signal from an end node.

FIG. 6 further depicts a Request (Group Membership Information Change) signal 604 being sent from the group communication module 211 to the group membership server module 313. The Request (Group Membership Information Change) signal 604 includes, e.g., information identifying the end node 200, and indicating multicast groups to which the end node 200 is requesting membership (e.g., joining) and/or is terminating membership (e.g., leaving). The Request (Group Membership Information Change) signal 604 is sent by the group communication module 211, e.g., in response to a change in group membership requirements indicated by a multicast group communication application. In some embodiments, the group communication module 211 starts a Request Retransmission Timer 612 upon sending the Request (Group Membership Information Change) signal 604 and retransmits the Request (Group Membership Information Change) signal 608 if a corresponding Response signal 606 is not received prior to expiry of the Request Retransmission Timer 612.

The group membership server module 313 sends a Response signal 606 to the group communication module 211 in response to receiving a Request (Group Membership Information Change) signal 604 from said group communication module 211. The Response signal 606 includes, e.g., a confirmation that the corresponding Request (Group Membership Information Change) signal 604 was received, an indication that one or more aspects of the corresponding Request (Group Membership Information Change) signal 604 were accepted, and/or an indication that the one or more aspects of the corresponding Request (Group Membership Information Change) signal 604 were not accepted.

In some embodiments, the group membership server module 313 in the access node 300 sends a Notification (Group Membership Information Change) signal 610 when group membership information in the access node 300 is changed without request by the end node 200. Such a change may occur, e.g., when a particular multicast service to which the end node 200 was joined is administratively terminated or can no longer be supported. The Notification (Group Advertisement) signal 602 may be transmitted via the wireless communication interface 330 in the access node 300 using either unicast (e.g., directed to a particular end node) or multicast (e.g., directed to a plurality of end nodes).

In some embodiments of the present invention, communications between nodes is based all, or in part, on the Internet Protocol (IP). Thus, communication of both data and/or control signaling between the network nodes may use IP packets, e.g., datagrams.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with code division multiple access (CDMA), orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method for communications, comprising:

generating, at a standard group membership client module in a mobile wireless terminal, signaling that does not enable an access node to maintain a group membership list;

generating, at a group communication module in the mobile wireless terminal, a group membership information change request signal based on the signaling, wherein the group membership information change request signal enables the access node to maintain the group membership list; and transmitting the group membership information change request signal to the access node to request a change in group membership.

2. The method of claim 1, further comprising receiving from the access node a response indicating acceptance or rejection of the group membership information change request signal.

3. The method of claim 1, further comprising retransmitting the group membership information change request signal when a response to the group membership information change request signal is not received in a preselected period of time.

4. The method of claim 1, wherein the group membership information change request signal requests that the access node add the mobile wireless terminal as a member of a group.

5. The method of claim 1, wherein the signaling is generated based on information obtained from a multicast group communication application.

6. The method of claim 1, wherein the standard group membership client module comprises a multicast listener discovery protocol module.

7. The method of claim 1, wherein the group communication module queries the standard group membership client module for group membership client information.

8. The method of claim 1, wherein the signaling comprises Internet group management protocol (IGMP) compliant signaling.

9. The method of claim 1, wherein:
the signaling that does not enable the access node to maintain the group membership list is directed toward the access node by the standard group membership client module; and
the group communication module intercepts the signaling.

10. An apparatus for communications, comprising:
a standard group membership client module in a mobile wireless terminal, the standard group membership client module being enabled to generate signaling that does not enable an access node to maintain a group membership list;
a group communication module in the mobile wireless terminal, the group communication module being enabled to generate a group membership information change request signal based on the signaling, wherein the group membership information change request signal enables the access node to maintain the group membership list; and
a transmitter module enabled to transmit the group membership information change request signal to the access node to request a change in group membership.

11. The apparatus of claim 10, further comprising a receiver module enabled to receive from the access node a response indicating acceptance or rejection of the group membership information change request signal.

12. The apparatus of claim 10, wherein the transmitter module is further enabled to retransmit the group membership information change request signal when a response to the group membership information change request signal is not received in a preselected period of time.

13. The apparatus of claim 10, wherein the group membership information change request signal requests that the access node add the mobile wireless terminal as a member of a group.

14. The apparatus of claim 10, wherein the standard group membership client module generates the signaling based on information obtained from a multicast group communication application.

15. The apparatus of claim 10, wherein the standard group membership client module comprises a multicast listener discovery protocol module.

16. The apparatus of claim 10, wherein the group communication module queries the standard group membership information client module for group membership client information.

17. The apparatus of claim 10, wherein the signaling comprises Internet group management protocol (IGMP) compliant signaling.

18. An apparatus for communications, comprising:
means for generating, in a mobile wireless terminal, signaling that does not enable an access node to maintain a group membership list;
means for generating, in the mobile wireless terminal, a group membership information change request signal based on the signaling, wherein the group membership information change request signal enables the access node to maintain the group membership list; and
means for transmitting the group membership information change request signal to the access node to request a change in group membership.

19. The apparatus of claim 18, further comprising means for receiving from the access node a response indicating acceptance or rejection of the group membership information change request signal.

20. The apparatus of claim 18, further comprising means for retransmitting the group membership information change request signal when a response to the group membership information change request signal is not received in a preselected period of time.

21. The apparatus of claim 18, wherein the group membership information change request signal requests that the access node add the mobile wireless terminal as a member of a group.

22. The apparatus of claim 18, wherein the means for generating signaling uses information obtained from a multicast group communication application.

23. The apparatus of claim 18, wherein the means for generating comprises a multicast listener discovery protocol module.

24. The apparatus of claim 18, further comprising means for querying a standard group membership information client module for group membership client information.

25. The apparatus of claim 18, wherein the signaling comprises Internet group management protocol (IGMP) compliant signaling.

26. A non-transitory computer-readable medium, comprising:
   instructions for generating, at a standard group membership client module in a mobile wireless terminal, signaling that does not enable an access node to maintain a group membership list;
   instructions for generating, at a group communication module in the mobile wireless terminal, a group membership information change request signal based on the signaling, wherein the group membership information change request signal enables the access node to maintain the group membership list; and
   instructions for transmitting the group membership information change request signal to the access node to request a change in group membership.

27. The non-transitory computer-readable medium of claim 26, further comprising instructions for receiving from the access node a response indicating acceptance or rejection of the group membership information change request signal.

28. The non-transitory computer-readable medium of claim 26, further comprising instructions for retransmitting the group membership information change request signal when a response to the group membership information change request signal is not received in a preselected period of time.

29. The non-transitory computer-readable medium of claim 26, wherein the group membership information change request signal requests that the access node add the mobile wireless terminal as a member of a group.

30. The non-transitory computer-readable medium of claim 26, wherein the signaling is generated based on information obtained from a multicast group communication application.

31. The non-transitory computer-readable medium of claim 26, wherein the standard group membership client module comprises a multicast listener discovery protocol module.

32. The non-transitory computer-readable medium of claim 26, further comprising instructions for causing the group communication module to query the standard group membership information client module for group membership client information.

33. The non-transitory computer-readable medium of claim 26, wherein the signaling comprises Internet group management protocol (IGMP) compliant signaling.

* * * * *